United States Patent [19]

Nishizawa et al.

[11] 4,119,679

[45] Oct. 10, 1978

[54] POWDER COATING COMPOSITION

[75] Inventors: Hiroshi Nishizawa; Shigeyoshi Tanaka; Minoru Fujishima, all of Ibaragi, Japan

[73] Assignee: Hitachi Chemical Company, Ltd., Tokyo, Japan

[21] Appl. No.: 840,777

[22] Filed: Oct. 11, 1977

Related U.S. Application Data

[63] Continuation-in-part of Ser. No. 624,260, Oct. 20, 1975, abandoned.

[30] Foreign Application Priority Data

Oct. 21, 1974 [JP] Japan ................ 49-120358

[51] Int. Cl.$^2$ .................. C08L 67/02; C08L 63/00
[52] U.S. Cl. .................. 260/835; 427/375; 427/386; 528/273; 528/116; 528/118; 528/117
[58] Field of Search ............. 260/835, 75 N, 75 T

[56] References Cited

U.S. PATENT DOCUMENTS

| | | | |
|---|---|---|---|
| 2,594,145 | 4/1952 | Flory | 260/75 N |
| 2,719,835 | 10/1955 | Sublett | 260/75 N |
| 3,408,421 | 10/1968 | Kurka | 260/835 X |
| 3,723,569 | 3/1973 | Hoeschele | 260/835 |
| 3,793,250 | 2/1974 | Schmidt et al. | 260/75 N |
| 3,864,316 | 2/1975 | Robinson | 260/835 X |

*Primary Examiner*—Lucille M. Phynes
*Attorney, Agent, or Firm*—William J. Daniel

[57] ABSTRACT

A powder coating composition which comprises a mixture of in a given proportion (A) a polyester resin which contains hydroxyl groups as functional group and contains at least 80 mol.% of an aromatic polycarboxylic acid component in the polycarboxylic acid component of said polyester resin, said polyester resin having a softening point of 50°–180° C, (B) a polyacyl-(N-lactam) compound or a polyacyl-(N-imide) compound having a softening point above 40° and (C) a said epoxy resin.

The powder coating composition has a very good storage stability, free flowability at room temperature and exhibits good melt flow characteristics when heated above 130° C for baking. Coating films prepared from this powder coating composition are excellent in the mechanical resistance, corrosion resistance, solvent resistance and luster.

9 Claims, No Drawings

POWDER COATING COMPOSITION

CROSS REFERENCE TO RELATED APPLICATIONS

This application is a continuation-in-part of the now abandoned application Ser. No. 624,260, filed Nov. 20, 1975.

BACKGROUND OF THE INVENTION

The present invention relates to a powder coating composition. More specifically, the invention relates to a powder coating composition which comprises a mixture of (A) a polyester resin containing as a functional group a hydroxyl group.

(B) a polyacyl-(N-lactam) compound or polyacyl-(N-imide) compound and (C) a solid epoxy resin.

In general, the properties required of a powder coating composition are (1) the necessity to be solid and so brittle as to permit easily pulverization at the normal temperature, (2) the possession of the free fluidity as powder at a temperature below 50° C. without blocking, (3) the possession of a good melt flow of resin necessary for forming a coating film on a flat surface and a proper gelling time at the time of baking the coating film at a temperature above 130° C., (4) the capacity of being kneaded with an auxiliary substance such as a pigment, a flowing agent or an antistatic agent at a temperature of about 100° C. without undergoing premature crosslinking, and (5) the possession of sufficient crosslinking density and a sufficient glass transition temperatures after baking. It is apparent that not only the inherent properties of the basic resin but also the selection of a curing agent are key points for satisfying the above mentioned various requirements.

Hitherto, epoxy resins are known to be useful as resins for powder coating composition. However, epoxy resins possess poor weather-resistance and are thus unsuited for applications subject to outdoor exposure for a long period of time. Known as resins possessing excellent weather-resistance are acrylic resins using a melamine resin etherified by alcohols as curing agent which, however, are poor in stability on storage and permit blocking at elevated temperatures; for example during the summer season.

There is also known to cure a carboxyl group-containing acrylic resin or a polyester resin using as a curing agent an epoxy resin such as triglycidyl isocyanurate. However, these resin compositions are also poor in stability on storage and tend to be subject to blocking at elevated temperature. In addition, the quality of the coating film prepared from these resin compositions cannot be said to be satisfactory.

As the result of many studies made to overcome the above mentioned drawbacks, it has now been found that a composition consisting essentially of a specific polyester resin, a curing agent of polyacyl-(N-lactam) compound and a solid epoxy resin are free of these drawbacks. The present invention is based on the above finding.

BRIEF SUMMARY OF THE INVENTION

In accordance with the present invention, there is provided a powder coating composition which comprises a mixture of (A) a polyester resin obtained by the polycondensation of at least one polyol and at least one polycarboxylic acid, said polyol and said polycarboxylic acid containing hydroxyl and carboxyl groups in such relative proportions and being condensed in such amounts as to provide free hydroxyl groups in the resultant polyester, at least 80 mol.% of said polycarboxylic acid being an aromatic carboxylic acid, said polyester having a softening point in the range of 50°–180° C.

(B) at least one curing agent for said polyester which is an aliphatic, cycloaliphatic, heterocyclic or aromatic compound having a softening point of at least 40° C. and contains at least two terminal groups of the general formulae:

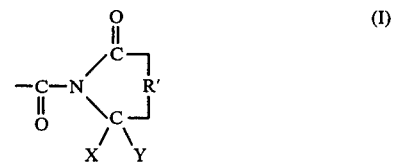

(I)

wherein R' stands for an alkylene group with 1–11 carbon atoms, and X and Y may be the same or different and each represents a hydrogen atom or an alkyl group with 1–5 carbon atoms, or

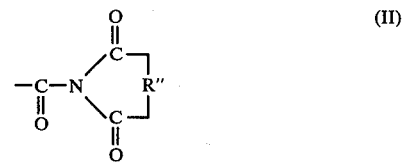

(II)

wherein R" stands for an alkylene group with 1–11 carbon atoms, an alkenylene group, a phenylene group or a substituted phenylene group, the amount of said curing agent being such that the terminal groups thereof are present in a ratio of 0.5–1.5 equivalents per equivalent of the free hydroxyl groups in said polyester. and (C) a solid epoxy resin in an amount of 3–15 parts by weight per 100 parts by weight of said ingredient (A).

In the present invention, the powder coating composition may be combined with, benzoin and/or a curing catalyst such as tetrabutyl titanate or a coordinated polymer thereof.

It is an object of the present invention to provide a powder coating composition which is free of the drawbacks of the known conventional similar powder coating compositions and which is excellent in stability on storage and gives a coating film of good quality especially in respect of weather-resistance and luster.

It is another object of the present invention to provide a powder coating composition possessing improved adherence, corrosion-resistance and flexibility.

It is still another object of the present invention to provide powder coating composition which can effectively prevent the formation of pinholes when used for the preparation of a thick coating film.

It is further object of the present invention to provide a powder coating composition which can easily be cured at relatively low temperatures.

Other and further objects, features and advantages of the Invention will appear more fully from the following description.

DETAILED DESCRIPTION OF THE INVENTION

The present invention provides a powder coating composition which comprises a mixture of (A) a polyester resin containing hydroxyl groups, (B) a polyacyl-(N-lactam) compound or a polyacyl-(N-imide) compound as a curing agent of said polyester resin and (C) a solid epoxy resin in a specific porportion.

A polyester resin used in the present invention as ingredient (A) is modified to have a softening point within a range from 50° C. to 180° C. and contains chiefly an aromatic polycarboxylic acid as the carboxylic acid component. This resin is a solid which permits no blocking at a temperature below 50° C. and shows a good melt flowing property at a temperature above 130° C.

The ingredient (A) is usually obtained by subjecting a polycarboxylic acid and a polyol to polycondensation. In this case, an aromatic polycarboxylic acid is used in an amount of 80-100 mol.% of the poly-carboxylic acid. This is an indispensable condition for constructing a bulky molecule necessary for a resin for powder coating. If necessary, an aliphatic, cycloaliphatic or heterocyclic polycarboxylic acid can be used for the remaining amount up to 20 mol.%. It is a matter of course that these polycarboxylic acids can be used in the form of lower alkyl esters or acid anhydrides thereof. Illustrative of the preferable aromatic polycarboxylic acid are phthalic acid, isophthalic acid, terephthalic acid, methylterephthalic acid, ethylterephthalic acid, trimellitic acid, pyromellitic acid, diphenolic acid.

Examples of the aliphatic polycarboxylic acid include malonic acid, succinic acid, glutaric acid, adipic acid, azelaic acid, sebacic acid, Dimer acid (dimerized product of unsaturated carboxylic acid) and the like. Examples of the cycloaliphatic and heterocyclic polycarboxylic acid include methylcyclohexenetricarboxylic acid, tetrahydrophthalic acid, hexahydrophthalic acid, tris-(2-carboxyethyl) isocyanurate and the like. Esters of these polycarboxylic acids with a lower alkanol such as methanol or ethanol and acid anhydrides of these acids can also be used as the polycarboxylic acid component. These polycarboxylic acids can be used alone or as a mixture of at least two.

Examples of the polyol component subjected to polycondensation with such polycarboxylic acid include ethylene glycol, propylene glycol, butylene glycol, n-hexylene glycol, neopentyl glycol, heptanediol, octadecanediol, diethylene glycol, triethylene glycol, glycerol, trimethylolethane, trimethylolpropane, pentaerythritol, 1,4-cyclohexanediol, tris-2-hydroxyethyl isocyanurate and the like. These polyols can be used alone or as a mixture of at least two.

In the reaction system for preparing the ingredient (A), i.e. a polyester resin containing hydroxyl groups, by polycondensation of the polycarboxylic acid with the polyol, the reactants are mixed in such a proportion that hydroxyl group of the polyol are present in amounts equal to 1.0-2.0, preferably more than 1.0, most preferably 1.2-1.8 equivalents per equivalent of carboxyl groups of the polycarboxylic acid. In the reaction, combination of the starting materials having bi-or more-functional groups is determined suitably in accordance with a conventional mode so as to give the ingredient (A) having hydroxyl groups sufficient for the thermo-setting hereinafter described. A usual polycondensation method is suitably utilized for the production of the polyester resin.

The polyester resin used in the present invention is prepared, for example, according to the following procedure: Using a given proportion of polycarboxylic acid and polyol, the reaction is conducted at a temperature of about 170°-190° C. while blowing into the reaction system an inert gas such as nitrogen. A large amount of water produced as by-product in the reaction system is quickly removed from the system by distillation. After lapse of several hours from the start of the reaction, the reaction temperature is raised to about 230°-250° C. and the reaction is continued at this temperature. The reaction is completed in about 15 hours. The use of a conventional catalyst for polyesterification is effective to promote the reaction. For example, a metal acetate such as lead acetate, a metal alkoxide such as tetrabutyl titanate or an oxide such as antimony oxide is used in an amount of 0.01-0.20% by weight based on the reactants. In case a lower alkyl ester of the aromatic dicarboxylic acid, such as dimethyl terephthalate, is used as the acid component, the polycondensation reaction is conducted by transesterification. The reaction is initiated at a temperature of about 190° C. while blowing an inert gas such as nitrogen into the reaction system. A lower alkanol, such as methanol, formed in a large amount in the reaction system as by-product is quickly removed therefrom by distillation. After lapse of several hours from the start of the reaction, the temperature was elevated to about 230°-250° C. and the reaction is continued at this temperature. The reaction is finished after about 10 hours. The addition of a catalyst such as a metal acetate, a metal alkoxide or an oxide in an amount of 0.01-0.20% by weight based on the reactants to the reaction system is effective to promote the reaction.

In the event the resultant polyester contains unreacted polyol the softening point of the resin is lowered and the resin tends to cause blocking during long-term storage as a resin for powder coating. If necessary, such a disadvantage can, however, be avoided by subjecting the resin in molten state to a treatment under reduced pressure. The starting materials, mixing ratio, reaction temperatures and reaction time are properly selected so that the polyester as ingredient (A) may be modified to have a softening point of 50°-180° C.

The ingredient (B) in the powder coating composition of the present invention, i.e. the polyacyl-(N-lactam) compound or polyacyl-(N-imide) compound functions as a curing agent. The ingredient (B) has at least two, preferably 2-6, terminal groups represented by the general formulae:

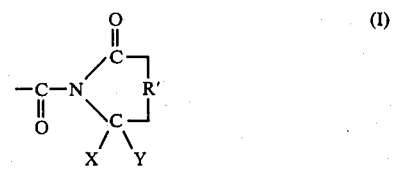

(I)

wherein R' stands for an alkylene group with 1-11, preferably 2-6 carbon atoms and X and Y may be same or different and each represents a hydrogen atom or an alkyl group with 1-5 carbon atoms, or

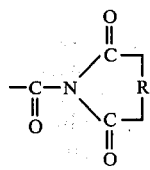

wherein R'' stands for an alkylene group with 1-11, preferably 2-6 carbon atoms, an alkenylene group, a phenylene group or a substituted phenylene group.

This compound is an aliphatic, cycloaliphatic, heterocyclic or aromatic compound, which may contain in the molecule an oxygen atom, nitrogen atom or an unsaturated bond in addition to the groupings of the general formula (I) or (II). In the case the ingredient (B) is an aliphatic compound, it may be substituted by an aryl group such as a phenyl or a substituted phenyl group or may contain in the molecule an arylene group such as a phenylene or substituted phenylene group. In the case the ingredient (B) is a cycloaliphatic, heterocyclic or aromatic compound, it may be substituted by an alkyl, haloalkyl or aryl group or may contain in the molecule an alkylene or haloalkylene group. These compounds have about 2-50 carbon atoms exclusive of the terminal groups of the general formula (I) or (II):

The ingredient (B) of the powder coating composition can be prepared, for example, by a dehydrochlorination or desalting reaction between (i) a polyacid chloride of a polybasic acid or a polyacid chloride of polybasic acid obtained by esterification of a polyhydric alcohol and a polybasic acid and (ii) a lactam compound or an imide compound or an alkali metal salt of these compounds.

Illustrative of the preferable polybasic acid are saturated aliphatic polybasic acids such as succinic acid, adipic acid, sebacic acid and dodecanedicarboxylic acid; unsaturated aliphatic polybasic acids such as fumaric acid; hetero atom-containing aliphatic polybasic acids such as diglycolic acid; aromatic polybasic acids such as terephthalic acid, isophthalic acid, trimellitic acid and pyromellitic acid; cycloaliphatic polybasic acids such as hexahydrophthalic acid, tetrahydrophthalic acid and methylcyclohexenetricarboxylic acid; and heterocyclic polybasic acids such as tri-N-ethylcarboxyl-triisocyanurate. These polybasic acids are used in the form of the polyacid chloride.

Examples of polyhydric alcohols include polyols utilizable as a starting material for preparing the ingredient (A).

Examples of the lactam compound include ε-caprolactam, pyrrolidone and the like. Examples of the imide compound include succinimide, phthalimide and the like.

Typical examples of the ingredient (B) used in the present invention include terephthaloyl-bis-(N-pyrrolidone), adipoyl-bis-(N-pyrrolidone), terephthaloyl-bis-(N-caprolactam), isophthaloyl-bis-(N-caprolactam), sebacoyl-bis-(N-caprolactam), adipoyl-bis-(N-caprolactam), isophthaloyl-bis-(N-succinimide), adipoyl-bis-(N-succinimide), sebacoyl-bis-(N-phthalimide), fumaroyl-bis-(N-caprolactam), fumaroyl-bis-(N-succinimide), diglycoloyl-bis-(N-caprolactam), diglycoloyl-bis-(N-succinimide), trimellitoyl-tris-(N-caprolactam), and compounds of the structural formulae:

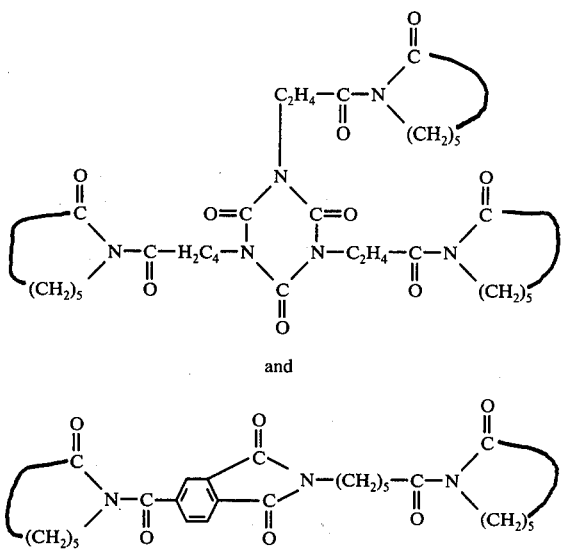

A mixture of polyacyl-(N-lactam) compounds consisting essentially of a compound containing 2-4 of the grouping represented by the structural formula:

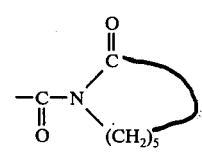

which is obtained by reacting a polyacid chloride obtained from trimethylolpropane and terephthaloyl or isophthaloyl chloride with ε-caprolactam in an amount equivalent to the acid chloride group in the polyacid chloride, is also included in the ingredient (B).

The ingredient (B) has a softening or melting point of preferably at least 40° C. and more preferably at least 50° C. and shows a good melt flowing property at a baking temperature of 130° C. or higher.

In the composition of the present invention, ingredient (A) and ingredient (B) are mixed in such a proportion that the groups of the general formula (I) or (II) in ingredient (B) are present in a ratio of 0.5-1.5, preferably 0.8-1.2 equivalents per equivalent of the hydroxyl groups in ingredient (A). If the amount of the ingredient (B) is less than 0.5 equivalent, the crosslinking density of the resulting coating film will be lowered with accompanying deterioration in mechanical characteristics. If the amount of ingredient (B) exceeds 1.5 equivalents, unreacted curing agent will remain in the resulting coating film whereby some properties such as chemicals-resisting property of the coating film will be deteriorated.

The powder coating composition of the present invention is thermosetting and thus forms a three dimemsionally cross-linked coating film by baking.

Hitherto, preparation of a thermosetting resin composition consisting of two ingredients is well-known.

For example, in accordance with the disclosure in U.S. Pat. No. 2,594,145 and JACS 63 pages 3083 et seq (1941), three dimensionally cross-linked structure can be formed when at least one of ingredients (A) and (B) has reactive functional groups in an amount more than two. For instance a straight chain polyester resin having hydroxyl groups at the both ends (ingredient (A)) is combined with a curing agent (ingredient (B)) having three or more N-acyllactam groups and/or N-acylimide groups per molecule. Further, a curing agent (ingredient (B)) having at least two N-acyllactam groups and/or N-acylimide groups can be combined with a branched polyester having hydroxyl groups more than two (ingredient (A)). This branched polyester can be prepared by using a tri-or more functional polyol or polycarboxylic acid, as a part or the whole of the starting material; i.e. the polyol and the polycarboxylic acid, in an amount in which the resultant polyester has hydroxyl groups more than two but does not cause gelation.

By mixing ingredient (A) with ingredient (B) in given proportions, the composition of the present invention shows a moderately prolonged gelling time combined with a rapid curing reaction at an elevated baking temperature, thereby affording a coating film of good appearance. The coating film is devoid of any coloration such as yellowing and exhibits excellent weather-resisting property.

The resin composition in the present invention is also excellent in dispersibility of a pigment thereinto so that coating of a thin film of 40μ or less in thickness can be attained.

A coating film particularly excellent in stain-resistance can be obtained when a mixture of polyacyl-(N-lactam) compounds chiefly having 2-4 of the groups represented by the structural formula:

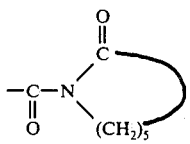

which is obtained by reacting ε-caprolactam with a polyacid chloride obtained from trimethylolpropane and terephtahloyl or isophthaloyl chloride, is used as ingredient (B) of the powder coating composition.

In the powder coating composition of the present invention, a solid epoxy resin as ingredient (C) is further contained to enhance adherence, corrosion-resistance and flexibility of the coating film prepared from the powder coating composition of this invention.

Illustrative of such epoxy resin are solid epoxy resins derived from bisphenols, for example, reaction products of bisphenols with epihalohydrins, such as Epikote 1001, Epikote 1004, Epikote 1007 and Epikote 1009 (Trade mark, Shell Chemical) and solid cycloaliphatic epoxy resins, for example, reaction products of hydrogenated bisphenols with epihalohydrins such as EPS-4085 (Trade mark, Asahi Denka Kogyo KK), Chissonox 313 and Chissonox 301 (Trade mark, Chisso KK). The solid epoxy resin has preferably softening point of more than 40° C.

This epoxy resin is used in an amount of 3-15 parts by weight per 100 parts by weight of ingredient (A). If the epoxy resin is used in an amount of less than 3 parts by weight, no beneficial effect is achieved. On the other hand, if the amount of the epoxy resin exceeds 15 parts by weight, the blocking-resistance of the resulting powder coating will suffer. Especially in the case of an epoxy resin derived from a bisphenol, the resulting film will become poor in weather-resistance on outdoor exposure and also in luster and permit occurrence of chalking, thus making the coating film unsuited for practical use.

The powder coating composition of the present invention can be mixed with benzoin to prevent the formation of pinholes effectively, especially in the case a thick film is coated on the objects to be treated. In general, pinholes are rarely observed in coating films having an ordinary thickness, for example, 80-100μ but can be found in coating films when their thickness reaches 100-120μ. The formation of pinholes becomes significant as the thickness of the coating film becomes larger. When producing a coating film having a thickness of 200μ or more, the formation of pinholes is unavoidable. Such imperfection in the coated film is an important problem in practical use since pinholes not only damage appearance of the finished coating but also permit generation and development of rust in the underlying substrate.

Benzoin is used in an amount of 0.1-6 parts by weight, preferably 0.5-3 parts by weight per 100 parts by weight of ingredient (A). Addition of benzoin to the coating composition serves to prevent the formation of pinholes effectively even when producing a thick coating film. If the amount of benzoin is less than 0.1 part by weight, no beneficial effect will be achieved by its addition. If the amount of benzoin exceeds 6 parts by weight, free fluidity as powder coating composition will decrease so that the composition easily tends to undergo blocking. In addition, yellowing of the coating film after baking becomes considerable so that the film is of no value for practical use.

Further, tetrabutyl titanate or a condensate thereof obtained by condensation of tetrabutyl titanate in the presence of water can be allowed to be present in the resin composition in the present invention. The term "tetrabutyl titanate" used herein means tetrabutyl titanate itself and a coordinated polymer present in high concentration solution thereof. By this treatment, the resultant powder coating composition is not deteriorated in stability on storage and exhibits satisfactory film characteristics even at a relatively low baking temperature below 180° C. Tetrabutyl titanate, a coordinated polymer or a condensate thereof are catalysts for curing reaction and are excellent in stability of powder coating composition on storage and adherence of the coating film, as compared with the case of using other curing catalysts.

Illustrative of ways for including tetrabutyl titanate, a coordinated polymer or a condensate thereof in the powder coating composition of the present invention are:

(i) tetrabutyl titanate or its derivative is added before or during synthesis of the polyester resin as a catalyst for synthesis of the polyester resin and then is made still effective as a catalyst for curing the powder coating composition.

(ii) After completion of the synthetic reaction for the polyester resin, tetrabutyl titanate or its derivative is added and kneaded while the polyester is kept in a molten condition.

(iii) On the production of the powder coating composition, tetrabutyl titanate or its derivative is added together with other components and kneaded in moltened state.

These methods may be combined. Particularly, the method (i) or (ii) or a combination thereof is preferable. The amount of tetrabutyl titanate or the amount of its derivative such as a coordinated polymer thereof or a condensate thereof in terms of tetraburyl titanate is 0.3-5.0 parts by weight, preferably 0.5-2.5 parts by weight per 100 parts by weight of the ingredient (A). If the amount of tetrabutyl titanate or its derivative is less than 0.3 part by weight, no beneficial effect will be achieved by its addition. On the other hand, if the amount exceeds 5.0 parts by weight, adherence of the resultant coating film will be poor.

The powder coating composition of the present invention may further be mixed, if desired, with other catalysts, pigments, fillers, fluidity adjusting agents and the like. Examples of such other catalysts include sulfonic acids such as p-toluenesulfonic acid and naphthalene-1,5-disulfonic acid; tetraalkylammonium salts such as tetrabutylammonium bromide, tetrabutylammonium chloride and tetrabutylammonium iodide; metal carboxylates such as zinc naphthenate, cobalt naphthenate, dibutyl tin dilaurate and lithium benzoate; alkali metal hydroxides and salts such as lithium hydroxide and lithium chloride; halogenated tin compounds such as stannous chloride, dimethyl tin chloride and dibutyl tin chloride; amine hydrochlorides such as dimethylaniline hydrochloride and semicarbazide hydrochloride; boron fluoride complexes such as monoethylamine complex of boron trifluoride and p-nitrobenzenediazonium fluoroborate; and alcoholates of metals such as titanium, vanadium and zirconium as well as their coordinated polymers obtained by coordination of the alcoholates and their condensates obtained by condensation of the alcoholates in the presence of water.

Examples of the pigments include titanium dioxide, red iron oxide, carbon black, iron black, ceramic black, chrome yellow, chrome orange, cadmium yellow, cadmium red, BON red, chrome oxide green, isoindolinone yellow, isoindolinone red, cobalt blue, cobalt green, phthalocyanine blue, phthalocyanine green, ultramarine blue, ceramic titanate, ceramic spinel and the like. These are conventional pigments for a powder coating composition.

For example, these pigments are disclosed in "Society of Manufacturing Engineers, Technical Paper", FC 72-958 (1972).

Examples of the fillers include calcium carbonate, calcium sulfate, barium sulfate and the like.

Examples of the fluidity adjusting agents include Modaflow (Trademark, Monsanto Co.), Acronal 4F (Trade mark, BASF), BUTBAR (Trade mark, Monsanto Co.) and the like. Besides, polylauryl acrylate, polybuthyl acrylate, poly(2-ethylhexyl acrylate), polylauryl methacrylate, polyisodecyl methacrylate and the like can be enumerated as the fluidity adjusting agents. Further, a fluidity adjusting agent such as Aerosil (Trade mark, Degussa) can be used. These are also well known fluidity adjusting agents in the art.

For example, Japanese No. 29842/1973 (laid open for public inspection without examination discloses these.

The preferred ranges for contents of materials for the powder coating composition described above are as follows. A preferable range of total of the pigment and the filler in the composition is 3-50% by weight. The fluiditity adjusting agent is present in the composition in a range from 0.05-5% by weight. The catalyst is present in an amount from 0.01% by weight to 5.0% by weight of the ingredient (A).

The powder coating composition of the present invention can be prepared by dry-blending the ingredients (A), (B) and (C) described above, optionally together with the above mentioned substances, and subjecting the blend to fusion milling at a temperature less than the reaction temperature of the respective ingredients, solidifying the mixture by cooling and subjecting the mixture to pulverization followed by sieving treatment. The solid mixture is pulverized to have an average particle diameter not greater than 250$\mu$, preferably not greater than 125$\mu$.

The thermosetting powder coating composition of the present invention is applied onto the objects to be treated, for example, by utilizing a usual coating method such as an electrostatic coating method, a fluidized bed coating method, an electrostatic fluidized bed coating method or the like. Baking of the coating film is effected at a temperature within a range of 130°-220° C., preferably 140°-200° C. for 5-30 minutes, preferably 10-20 minutes.

The following synthetic examples illustrate the methods of synthetizing the polyesters as the ingredient (A) and polyacyl(N-lactam) compounds and polyacyl-(N-imide) compounds as the ingredient (B).

Synthesis of the Polyesters as the Ingredient (A)

SYNTHETIC EXAMPLE 1

A mixture of 2.0 mols (388g) of dimethyl terephthalate, 1.90 mols (197.6g) of neopentyl glycol, 0.4 mol (53.6g) of trimethylolpropane and 0.192g of tetrabutyl titanate was heated at about 180° C. for 5 hours while the produced methanol was removed from the reaction system. The reaction temperature was then elevated to 230° C. and the mixture was heated at this temperature for 10 hours to complete the transesterification reaction. After completion of the reaction, a polyester resin in a molten state was poured in a tin-plate dish. After cooling, the solidified resin was pulverized into particles of a proper size. The polyester resin thus obtained had a softening point of 71°-81° C. and a hydroxyl number of 90 (KOH mg/g).

SYNTHETIC EXAMPLE 2

A mixture of 99.6 g (0.6 mol) of terephthalic acid, 66.4 g (0.4 mol) of isophthalic acid, 83.2 g (0.8 mol) of neopentyl glycol, 40.2 g (0.3 mol) of trimethylolpropane, 7.3 g (0.05 mol) of adipic acid and 0.089 g of tetrabutyl titanate was heated at about 190° C. for 5 hours. The produced water was quickly removed from the reaction system. The reaction temperature was then elevated to 235° C. and the mixture was heated at this temperature for 10 hours to complete the reaction. A polyester resin thus formed in a molten state in the reaction system was maintained as such under reduced pressure down to 2 mmHg with vigorous stirring whereby volatile matters were eliminated. The polyester resin in the form of a white solid at room temperature was thus obtained which had a softening point of 70°-80° C., a hydroxyl number of 120 (KOH mg/g), an acid number of 5 (KOH mg/g) and could easily be pulverized.

SYNTHETIC EXAMPLE 3

A mixture of 788.5 g (4.75 mols) of terephthalic acid, 36.5 g (0.25 mol) of adipic acid, 353.6 g (3.4 mols) of neopentyl glycol, 76.5 g (0.85 mol) of 1,4-butanediol, 160.8 g (1.2 mols) of trimethylolpropane and 8.6 g of dibutyl tin oxide was heated at about 190° C. The temperature was gradually elevated and the reaction was performed for 15 hours in all while removing the produced water from the reaction system. The temperature at the time of completion of the reaction was 230° C. The resultant polyester resin was poured in a tin-plate dish and pulverized into particles of a proper size after cooling. The polyester resin thus obtained had a softening point of 75°–80° C., a hydroxyl number of 100 (KOH mg/g) and an acid number of 4 (KOH mg/g).

SYNTHETIC EXAMPLE 4

A mixture of 970 g (5.0 mols) of dimethyl terephthalate, 416 g (4.0 mols) of neopentyl glycol, 201 g (1.5 mols) of trimethylolpropane and 0.952 g of tetrabutyl titanate was heated at about 180° C. for 5 hours while removing the produced methanol from the reaction system. The temperature was then elevated to 230° C. and the mixture was kept at this temperature for 10 hours to complete the transesterification reaction. After completion of the reaction, the resulting resin in a molten state was poured in a tin-plate dish. After cooling, the solidified resin was pulverized into particles of a proper size. The polyester resin thus obtained had a softening point of 76°–81° C. and a hydroxyl number of 100 (KOH mg/g).

SYNTHETIC EXAMPLE 5

A mixture of 1.6 mols (265.6g) of terephthalic acid, 0.4 mol (64.0 g) of adipic acid, 1.0 mol (104.0 g) of neopentyl glycol, 1.0 mol (90.0 g) of 1,4-butanediol, 0.2 mol (26.8 g) of trimethylolpropane and 3.3 g of dibutyl tin oxide was heated at about 190° C. The temperature was gradually elevated and the mixture was reacted for 10 hours while removing the produced water from the reaction system.

The temperature at the time of completion of the reaction was about 230° C. The reaction product was poured in a tin-plate dish. After cooling, the solidifed product was pulverized into particles of a proper size. The polyester resin thus obtained had a softening point of 68°–97° C., a hydroxyl number of 60 (KOH mg/g) and an acid number of 6 (KOH mg/g).

SYNTHETIC EXAMPLE 6

A mixture of 970 g (5 mols) of dimethyl terephthalate, 442 g (4.25 mols) of neopentyl glycol, trimethylolpropane and 0.47 g (0.03% by weight based on the reactants) of tetrabutyl titanate was heated at 180°–190° C. for 6 hours while removing the produced methanol from the reaction system. The temperature was then raised to 220°–230° C. and the mixture was heated at this temperature for 4 hours to complete the reaction. The polyester resin thus obtained was a light yellow transparent solid at room temperature and had a softening point of 75°–85° C., a hydroxyl number of 102 (KOH mg/g) and a reduced viscosity of 0.14 dl/g (resin 0.5 g/chloroform dl, 30° C.).

SYNTHETIC EXAMPLE 7

A mixture of 830 g (5 mols) of terephthalic acid, 442 g (4.25 mols) of neopentyl glycol, 110.4 g (1.20 mols) of glycerol and 6.9 g (0.5% by weight based on the reactants) of dibutyl tin oxide was heated at 180°–190° C. for 6 hours while removing the produced water from the reaction system. The temperature was then raised to 210°–220° C. and heating of the mixture was continued at this temperature for 5 hours to complete the reaction. The resin thus obtained was a light yellow transparent solid having a softening point of 74°–81° C., a hydroxyl number of 100 (KOH mg/g), an acid number of 5.8 (KOH mg/g) and a reduced viscosity of 0.16 dl/g (0.5 g resin/chloroform dl, 30° C.).

SYNTHETIC EXAMPLE 8

A polyester resin was synthetized according to the same process as described in the foregoing Synthetic Example 6 except that prior to completion of the reaction B-4 (a condensate of tetrabutyl titanate manufactured by Nihon Soda KK) was added in an amount of 1.5% by weight based on the reactants and the mixture was then stirred for 30 minutes at 200° C. This resin had a softening point of 77°–87° C., a hydroxyl number of 96 (KOH mg/g), and a reduced viscosity of 0.15 dl/g (0.5 g resin/chloroform dl. 30° C.).

SYNTHETIC EXAMPLE 9

A polyester resin was synthetized according to the same process as described in the foregoing Synthetic Example 7 except that prior to completion of the reaction tetrabutyl titanate was added in an amount of 1.0% by weight based on the reactants and the mixture was then stirred for 30 minutes at 200° C. This resin had a softening point of 75°–83° C., a hydroxyl number of 98 (KOH mg/g), an acid number of 5.5 (KOH mg/g) and a reduced viscosity of 0.17 dl/g (0.5 g resin/dl chloroform, 30° C.).

SYNTHETIC EXAMPLE 10

A mixture of 970 g (5 mols) of dimethyl terephthalate, 442 g (4.25 mols) of neopentyl glycol, 160.8 g (1.2 mols) of trimethylolpropane and of tetrabutyl titanate (2.0% by weight based on the reactants) was heated at 180°–190° C. for 6 hours while removing the produced methanol from the reaction system. The temperature was then elevated to 220°–230° C. and heating of the mixture was continued for 4 hours to complete the reaction. The resin thus obtained was a light yellow transparent solid having a softening point of 74°–83° C., a hydroxyl number of 101(KOH mg/g) and a reduced viscosity of 0.13 dl/g (0.5 g resin/dl chloroform, 30° C.).

SYNTHESIS OF POLYACYL-(N-LACTAM) COMPOUNDS AND POLYACRYL (N-IMIDE) COMPOUNDS

SYNTHETIC EXAMPLE 11

In a 1-liter four-necked flask equipped with a thermometer, an inlet for nitrogen, a dropping funnel and a stirrer were charged 678 g (6 mols) of dried ε-caprolactam while introducing an appropriate amount of nitrogen into the flask. The ε-caprolactam was heated to 85° C. whereby it was fused. To the fused ε-caprolactam were added with vigorous stirring 203 g (1 mol) of isophthaloyl chloride in small portions over a period of 1 hour. An exothermic reaction then started and the temperature of the reaction mixture was raised to 90° C. The reaction mixture was continuously kept at 90° C. for 5 hours and then cooled to room temperature whereupon the reaction product was solidified. The reaction product was taken out, thoroughly pulverized in a mortar, washed several times with 2000g of water, separated by filtration and finally dried at 80° C. for 6 hours under reduced pressure of 2 mmHg. A crude product thus obtained was recrystallized from alcohol whereby crystalline isophthaloyl-bis-(N-caprolactam) represented by the structural formula:

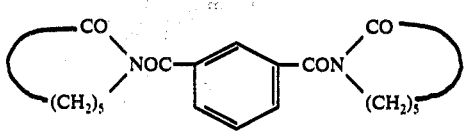

and having a melting point of 138°–140° C. was obtained in a yield of 150 g (theoretical yield: 356 g).

Elementary analysis as $C_{20}H_{24}O_4N_2$ (molecular weight: 356): Calc.: C: 67.4%, H: 6.7%, N: 7.9%, O: 18.0%. Found: C: 67.0%, H: 6.6%, N: 7.1%.

SYNTHETIC EXAMPLE 12

Sebacoyl-bis-(N-caprolactam) was synthetized and isolated in the same manner as described in Synthetic Example 11 except that 239 g (1 mol) of sebacoyl chloride and 678 g (6 mols) of ε-caprolactam were used as the reactants.

The yield of the resulting sebacoyl-bis-(N-caprolactam) which can be represented by the structural formula:

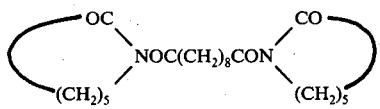

and had a melting point of 54°–56° C. was 311 g (theoretical yield: 392 g).

Elementary analysis as $C_{22}H_{36}N_2O_4$ (molecular weight: 392): Calc.: C: 67.3%, H: 9.2%, N: 7.2%, O: 16.3%. Found: C: 67.1%, H: 9.2%, N: 7.5%.

SYNTHETIC EXAMPLE 13

In a reactor similar to that used in Synthetic Example 11 were placed 594 g (6 mols) of dried succinimide and 400 g of dehydrated and purified dimethylformamide. The mixture was heated to 85° C. to effect dissolution of the succinimide. To the solution was added dropwise 183 g (1 mol) of adipoyl chloride from a dropping funnel under vigorous agitation whereby an axothermic reaction took place and the temperature of the reaction mixture was raised to 90° C. The reaction mixture was continuously kept at 90° C. for 3 hours and then cooled to room temperature. The reaction prodct was slowly added dropwise to 5000 g of water whereby a white precipitate was formed in the liquid. The whole was filtered and a powdery product collected on a filter was washed several times with 2000 g of water and then recrystallized from alcohol. The resulting crystalline adipoly-bis-(N-succinimide) was obtained in a yield of 231 g (theoretical yield: 308 g), which has the following structural formula:

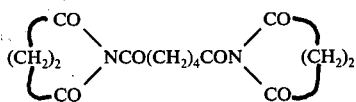

Elementary analysis as $C_{14}H_{16}N_2O_6$ (molecular weight: 308): Calc.: C: 54.5%, H: 5.2%, N: 9.1%, O: 31.2%. Found: C: 55.2%, H: 6.1%, N: 9.0%.

SYNTHETIC EXAMPLE 14

In a 2-liter four-necked flask equipped with a thermometer, an inlet for nitrogen, a dropping funnel and a stirrer were placed 1.0 mol (203 g) of terephthaloyl chloride and then 600 g of toluene for dissolving the acid chloride. Separately, 2.1 mols (237.3 g) of ε-caprolactam and 2.1 mols (254.1 g) of dimethylaniline were dissolved in 400 g of toluene. From the dropping funnel, thus toluene solution was added dropwise to the dichloride solution in the flask over a period of 30 minutes. An exothermic reaction took place and the temperature of the reaction mixture was elevated to about 50° C. The temperature was then raised to 80° C. and the reaction was conducted at this temperature for 90 minutes. The precipitated terephthaloyl-bis-(N-caprolactam) and dimethylaniline hydrochloride were separated by filtration from the liquid and the precipitate was washed with diluted hydrochloric acid and water to wash out the dimethylaniline hydrochloride and then dried whereupon terephthaloyl-bis-(N-caprolactam) having a melting point of 194°–197° C. was obtained in a yield of 302.6 g. This product is shown by the following structural formula:

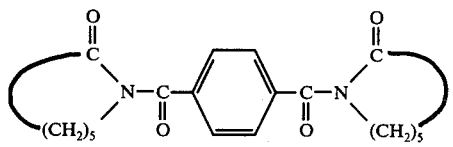

Elementary analysis as $C_{20}H_{24}N_2O_4$: Calc.: C: 67.4%, H: 6.7%, N: 7.9%. Found: C: 67.5%, H: 6.6%, N: 7.8%.

SYNTHETIC EXAMPLE 15

In a 2-liter four-necked flask equipped with a thermometer, an inlet for nitrogen, a dropping funnel and a stirrer were placed 365.4 g (1.8 mols) of terephthaloyl chloride and then 500 g of dry toluene for dissolving the chloride. Separately, 80.4 g (0.6 mol) of trimethylolpropane and 181.8 g (1.8 mols) of triethylamine were dissolved in 216 g of toluene. From the dropping funnel this toluene solution was added dropwise to the chloride solution in the flask over a period of 1 hour. As the reaction was exothermic, the flask was cooled and the reaction mixture was kept at 35° C. The reaction was further continued for 30 minutes and the temperature was then elevated to 80° C. Separately, 203.4 g (1.8 mols) of ε-caprolactam and 181.8 g (1.8 mols) of triethylamine were dissolved in 432 g of toluene and this solution was added dropwise from the dropping funnel to the reaction mixture in the flask over a period of 1 hour. As the reaction was exothermic, the flask was cooled to keep the reaction mixture at 80° C. The reaction was further continued for 3 hours. The reaction mixture was then cooled to room temperature and the precipitated triethylamine hydrochloride was filtered off. The triethylamine hydrochloride and the remaining triethylamine were washed out with diluted hydrochloric acid and water. The liquid was dehydrated with potassium carbonate and then concentrated. To the concentrated liquid was added a fivefold amount of cyclohexane to extract the reaction product. A resinous product was collected by filtration and dried in the form of a thin film whereby a heavily syrupy curing agent was obtained. After drying at 60° C. or 6 hours under reduced pressure of 2 mm Hg, the product having a melting point of 85°–135° C. was obtained in a yield of 313.3 g.

SYNTHETIC EXAMPLE 16

A curing agent was synthetized in the same manner as described in Synthetic Example 15 except that isophthaloyl chloride was used in place of terephthaloyl chloride. The curing agent having a melting point of 76°–129° C. was obtained in a yield of 350.0 g.

The curing agents obtained in Synthetic Examples 15 and 16 were respectively a mixture of polyacyl-(N-lactam) compounds consisting essentially of a compound having two to four of the groups of the formula:

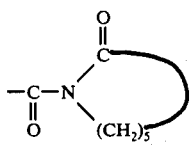

To further illustrate the present invention and not by way of limitation, the following examples are given.

EXAMPLES 1–5

A mixture of a composition shown in Table 1 were charged into a 10 liter Henschel mixer where the mixture was dry mixed at 1000 r.p.m. for 3 minutes. The mixture was then kneaded under fusion in a Ko--Kneader PR-46 (Buss Company Ltd.). A barrel temperature, a screw temperature and a rotation speed thereof in this treatment were 90° C., 75° C. and 50 r.p.m., respectively. An average resident time was 50 seconds and the temperature of the discharged product was about 100° C. After cooling, the product was subjected to rough pulverization followed by fine pulverization whereby a dust paint having an average particle diameter of 40µ and the maximum particle diameter of 90µ was obtained.

Onto a steel panel pretreated with Bonderite #144, the powder paint was applied by means of electrostatic spray coating until a coating film of a thickness as shown in Table 2 was obtained. The coating film was then baked for 30 minutes at 180° C. The result of tests conducted for examining the characteristics of the coating film are shown in Table 2.

Table 1

| Ingredient | \multicolumn{5}{c}{Example} |
|---|---|---|---|---|---|
|  | 1 | 2 | 3 | 4 | 5 |
| The polyester resin obtained in Synthetic Example 3 | 35.0 | 35.0 | — | — | 39.7 |
| The polyester resin obtained in Synthetic Example 4 | — | — | 35.0 | 35.0 | — |
| The curing agent obtained in Synthetic Example 15 | 18.0 | 18.0 | — | — | — |
| The curing agent obtained in Synthetic Example 16 | — | — | 18.0 | 18.0 | — |
| Isophthaloyl-bis-(N-caprolactam) | — | — | — | — | 13.3 |
| Epikote 1004 (Shell Chemical) | 5.0 | 5.0 | 5.0 | 5.0 | 5.0 |
| Acronal 4F (BASF) | 1.0 | 1.0 | 1.0 | 1.0 | 1.0 |
| Benzoin | 1.0 | 1.0 | 1.0 | 1.0 | 1.0 |
| Titanium white | 40 | 50 | 40 | 50 | 40 |

(Remarks: The unit is "part(s) by weight".)

Table 2

| Item | Example 1 | 2 | 3 | 4 | 5 |
|---|---|---|---|---|---|
| Thickness of coating film (µ) | 70 | 30 | 70 | 30 | 70 |
| Luster (%) Reflection at 60° C mirror plane) | 94 | 95 | 95 | 97 | 96 |
| Erichsen value (mm) (By Erichsen testing machine, diameter of punch : 20 mm) | 7< | 7< | 7< | 7< | 7< |
| Impact value (cm) (By Dupont impact tester, load : 500g Diameter of hammer : ½ in.) | 50< | 50< | 50< | 50< | 50< |
| Salt spray test (mm) (width of rust) | 0 – 1 | 0 – 1 | 0 – 1 | 0 – 1 | 0 – 1 |
| Alkali-resisting property | No change | No change | No change | No change | No change |
| Boiling water-resisting property | No change | No change | No change | No change | No change |
| Weather-resisting property (%) (Luster retention rate) | 89 | 85 | 90 | 88 | 91 |
| Stain-resistance | ◌ | ◉ | ◉ | ◉ | ○ |

Notes:
(1) The salt spray test was conducted for examining the width of rust after 480 hours in accordance with the method of JIS 2030.
(2) The alkali-resisting property was evaluated by examining the surface condition of a coating film on test panels having been immersed in 5% aqueous solution of NaOH for 120 hours.
(3) The boiling water-resisting property was evaluated by examining the surface condition of a coating film on test panels having been immersed in boiling water for 4 hours.
(4) The weather-resisting property was evaluated by examining luster retention rate of test panels after subjecting them to an artificial weathering test conducted for 300 hours using sunshine weather-O-meter.
(5) Stain-resistance was examined by a testing method wherein test panels marked with red magic ink and then wiped out by a cloth moistened with a mixture (1:1 by weight ratio) of methanol and toluene. The mark ◉ stands for the case where the ink was completely or substantially erased while the mark ○ for the case where the ink was somewhat retained on the test panels.

As is evident from the results shown in Table 2, the resin composition of the present invention exhibits excellent characteristics in all of the tests. Especially excellent stain-resistance was achieved when a curing agent obtained by reacting ε-caprolactam with a polyacid chloride derived from trimethylolpropane and terephthaloyl chloride or isophthaloyl chloride was used in combination with the polyester resin.

EXAMPLES 6–13

A powder paint of thermocurable polyester series was prepared using ingredients of a composition shown in Table 3. The individual ingredients were charged into a 10 liter Henschel mixer where the mixture was dry-mixed for 3 minutes at 1000 r.p.m. The mixture was then kneaded under fusion in Ko-Kneader PR46 (Buss Company Ltd.). A barrel temperature, a screw temperature and a rotation speed thereof in this treatment were 90° C., 75° C. and 50 r.p.m., respectively. An average resident time was 50 seconds and the temperature of the discharged product was about 100° C. After cooling, the product was subjected to rough pulverization followed by fine pulverization whereby a powder paint having an average particle diameter of 40µ and the maximum particle diameter of 90µ was obtained.

| Ingredient | \multicolumn{8}{c}{Example} |
|---|---|---|---|---|---|---|---|---|
|  | 6 | 7 | 8 | 9 | 10 | 11 | 12 | 13 |
| The polyester resin obtained in Synthetic Example 1 | — | — | — | 48 | 48 | 48 | — | — |
| The polyester resin obtained in Synthetic Example 5 | 50 | 50 | 50 | — | — | — | 51 | 51 |
| Terephthaloyl-bis-(N-caprolactam) | 10 | 10 | 10 | — | — | — | 48 | 48 |
| Adipoyl-bis-(N-succinimide) | — | — | — | 12 | 12 | 12 | 42 | 42 |
| Benzoin | 0 | 10 | 20 | 0 | 10 | 20 | 0 | 10 |

-continued

| Ingredient | Example | | | | | | | |
|---|---|---|---|---|---|---|---|---|
| | 6 | 7 | 8 | 9 | 10 | 11 | 12 | 13 |
| Epikote 1004 | 50 | 50 | 50 | 50 | 50 | 50 | 50 | 50 |
| Titanium white | 34 | 33 | 32 | 34 | 33 | 32 | 34 | 33 |
| Acronal 4F* | 1.0 | 1.0 | 1.0 | 1.0 | 1.0 | 1.0 | 1.0 | 1.0 |

*commercially available from BASF
Remarks: The unit of numerals is "part(s) by weight".

The powder paint was applied onto a steel panel pretreated with Bonderite #144, by means of electrostatic spray coating until a coating film of a thickness of 60–200μ was obtained. The coating film was then baked for 30 minutes at 180° C. Table 4 and Table 5 show respectively the condition of pinholes in the film and the results of tests conducted for examining the characteristics of the film.

Table 4

| Thickness of Coating (μ) | Paint No. | | | | | | | |
|---|---|---|---|---|---|---|---|---|
| | 6 | 7 | 8 | 9 | 10 | 11 | 12 | 13 |
| 60 | O | O | O | O | O | O | O | O |
| 80 | O | O | O | O | O | O | O | O |
| 100 | Δ | O | O | Δ | O | O | Δ | O |
| 120 | Δ | O | O | Δ | O | O | Δ | O |
| 140 | X | O | O | X | O | O | X | O |
| 160 | X | O | O | X | O | O | X | O |
| 180 | X | O | O | X | O | O | X | O |
| 200 | X | O | O | X | O | O | X | O |

Notes:
O .... No detection of pinholes in the coating film
Δ .... Detection of pinholes locally in the coating film
X .... Detection of pinholes all over the coating film Table 5

| Item | | Example | | | | | | | |
|---|---|---|---|---|---|---|---|---|---|
| | | 6 | 7 | 8 | 9 | 10 | 11 | 12 | 13 |
| Luster (%) | | 92 | 94 | 93 | 96 | 95 | 97 | 94 | 93 |
| Erichsen value (mm) | | >8 | >8 | >8 | >8 | >8 | >8 | >8 | >8 |
| Impact value (cm) | | >50 | >50 | >50 | >50 | >50 | >50 | >50 | >50 |
| Salt spray test (480 hours) | Flat part Cross hatch part | No change | No change | No change | No change | No change | No change | No change | No change |
| | Width of taping peeled off (mm) | 0 – 1 | 0 – 1 | 0 – 1 | 0 – 1 | 0 – 1 | 0 – 1 | 0 – 1 | 0 – 1 |
| Heat-resisting property (ΔE) | | 4.5 | 4.3 | 4.8 | 4.2 | 4.4 | 4.0 | 3.9 | 4.1 |
| Weather-resisting property | Luster retention rate (%) | 80 | 82 | 86 | 81 | 84 | 85 | 79 | 87 |
| | ΔE | 1.6 | 2.1 | 1.9 | 1.8 | 2.2 | 2.1 | 1.6 | 1.7 |

Notes:
(1) Luster, Erichsen value, Impact value, Salt spray test and weather-resisting property were determined according to the same examining methods as referred to in Table 2.
(2) The heat-resisting property was evaluated by examining color difference before and after the heat treatment conducted by heating test panels at 180° C for 50 hours
(3) ΔE of weather-resisting property was evaluated by examining color difference of the test panels before and after the test using Sunshine Weather-O-meter.
(4) The color difference was measured by AUD-CH-GV$_3$-H (Suga Shikenki KK).

As is evident from the results of Table 4, pinholes were not observed in the case of the film having a thickness of 60–80μ, regardless of whether benzoin was added or not. In case benzoin was not added, some pinholes were found when the thickness became 100μ and a considerable number of pinholes were found when the thickness became 140μ. In case benzene was added, however, no pinhole was detected even when the thickness reached 200μ.

As is evident from the results of Table 5, addition of benzoin gives no adverse influence on the other useful characteristics of the coating film, thus warranting good surface condition of the film.

EXAMPLES 14–21

A mixture of a composition shown in Table 6 was charged into a 10 liter Henschel mixer where the mixture was mixed for 5 minutes under agitation at 1000 r.p.m. The mixture was then kneaded under fusion in a Ko-Kneader PR-46 (Buss Company Ltd.). A barrel temperature, a screw temperature and a rotation speed thereof in this treatment were 90° C., 75° C. and 50 r.p.m. An average resident time was 50 seconds and the temperature of the discharged product was 97° C. After cooling, the product was immediately subjected to rough pulverization followed by fine pulverization whereby a powder paint having an average particle diameter of 35μ and the maximum particle diameter of 90μ was obtained.

The powder paint was applied by means of electrostatic spray coating onto a steel panel pretreated with Bonderite #144. The resulting coating film was baked in two ways, one at 180° C. for 20 minutes and the other at 160° C. for 20 minutes. The results of tests made on the coating films are shown in Table 7.

Table 6

| Ingredient | Example | | | | | | | |
|---|---|---|---|---|---|---|---|---|
| | 14 | 15 | 16 | 17 | 18 | 19 | 20 | 21 |
| The polyester resin obtained in Synthetic Example 6 | — | — | — | — | 42.0 | — | — | — |
| The polyester resin obtained in Synthetic Example 7 | — | — | — | 42.0 | — | 42.0 | 42.0 | 42.0 |
| The polyester resin obtained in Synthetic Example 8 | 42.0 | — | — | — | — | — | — | — |
| The polyester resin obtained in Synthetic Example 9 | — | 42.0 | — | — | — | — | — | — |
| The polyester resin obtained in Synthetic Example 10 | — | — | 42.0 | — | — | — | — | — |
| Terephthaloyl-bis-(N-caprolactam) | 13.4 | 13.4 | 13.4 | 13.4 | 13.4 | 13.4 | 13.4 | 13.4 |
| Tetrabutyl titanate | — | — | — | 0.5 | — | — | — | — |
| p-Toluenesulfonic acid | — | — | — | — | — | — | 0.5 | — |
| Stannous chloride | — | — | — | — | — | — | — | 0.5 |
| Titanium dioxide | 41.0 | 41.0 | 41.0 | 40.5 | 41.0 | 41.0 | 40.5 | 40.5 |
| Acronal 4F | 0.6 | 0.6 | 0.6 | 0.6 | 0.6 | 0.6 | 0.6 | 0.6 |

Table 6-continued

| Ingredient | Example | | | | | | | |
|---|---|---|---|---|---|---|---|---|
| | 14 | 15 | 16 | 17 | 18 | 19 | 20 | 21 |
| (BASF) Epikote 1004 (Shell Chemical) | 2.0 | 2.0 | 2.0 | 2.0 | 2.0 | 2.0 | 2.0 | 2.0 |
| Benzoin | 1.0 | 1.0 | 1.0 | 1.0 | 1.0 | 1.0 | 1.0 | 1.0 |
| The content of tetrabutyl titanate for the ingredient (A) (% by weight) | 1.5* | 1.0 | 2.0 | 1.2 | 0.03 | 0 | 0 | 0 |

Remarks: All the numerals except those in the lowest line are shown by "part by weight"
*B-4 (tetrabutyl titanate marketed from Nihon Soda KK)

Table 7

| | Examples | | | | | | | | | | | | | | | |
|---|---|---|---|---|---|---|---|---|---|---|---|---|---|---|---|---|
| | 14 | | 15 | | 16 | | 17 | | 18 | | 19 | | 20 | | 21 | |
| Item | Baking temperature (° C) | | | | | | | | | | | | | | | |
| | 180 | 160 | 180 | 160 | 180 | 160 | 180 | 160 | 180 | 160 | 180 | 160 | 180 | 160 | 180 | 160 |
| Luster (%) | 94 | 95 | 96 | 94 | 94 | 94 | 93 | 92 | 93 | 93 | 95 | 94 | 95 | 95 | 92 | 91 |
| Erichsen value (mm) | 7.8 | 7.0 | 8.0 | 7.5 | 7.5 | 7.3 | 7.9 | 7.4 | 8.0 | 0.2 | 7.7 | 0.2 | 7.9 | 6.8 | 8.0 | 6.4 |
| Impact value (cm) | 50 | 50 | 50 | 45 | 50 | 50 | 50 | 45 | 50 | 20 | 50 | 15 | 50 | 40 | 50 | 35 |
| "Cross cut" Test (for examining adhesiveness to the film to substrate) | 100/100 | 100/100 | 100/100 | 100/100 | 100/100 | 100/100 | 100/100 | 100/100 | 100/100 | 100/100 | 100/100 | 100/100 | 100/100 | 90/100 | 98/100 | 94/100 |
| "Cross cut" Test after immersion of test panels in boiling water for 4 hours | 100/100 | 100/100 | 100/100 | 100/100 | 100/100 | 100/100 | 100/100 | 100/100 | 100/100 | 100/100 | 100/100 | 100/100 | 53/100 | 0/100 | 30/100 | 0/100 |
| Anti-blocking property of the paint (days) | 60 | | 90 | | 70 | | 75 | | 80 | | 120 | | 10 | | 7 | |

Notes:
(1) The tests for examining luster, Erichsen value and Impact value were conducted according to the methods referred to in Table 2.
(2) The "Cross cut" test was conducted according to a testing method wherein 100 squares (each 1 mm square) are lined on the coating film by a knife and covered with a cellophan tape which is then peeled off from the coating film. The number of denominator stands for the original number of squares while the numerator for the number of squares retained after peeling off the cellophan tape from the coating film.
(3) The anti-blocking property of the paint was examined by storing the paint at 40° C until blocking occurred. The number stand for days needed for permitting occurrence of blocking.

As is evident from Table 7, the use of tetrabutyl titanate in the resin composition of the present invention warrants to obtain satisfactory film characteristics even in case of baking the coating film at a relatively low temperature.

The foregoing Examples 1-21 apparently show that the resin composition of the present invention is excellent in weather-resisting property, adhesiveness, solvent-resisting property, anti-corrosive property and has good appearance including luster. Furthermore, the resin composition has a good pigment dispersibility and thus permits coating with a thin film.

It is understood that the preceding representative examples may be varied within the scope of the present specification, as to reactants, reaction conditions, mixing proportion and working conditions, by those skilled in the art to achieve essentially the same results.

As many apparently widely different embodiments of this invention may be made without departing from the spirit and scope thereof, it is to be understood that this invention is not limited to the specific embodiments thereof except as defined in the appended claims.

What is claimed is:

1. A powder coating composition which comprises a mixture of
   (A) a polyester resin obtained by the polycondensation of at least one polyol and at least one polycarboxylic acid, said polyol and said polycarboxylic acid containing hydroxyl and carboxyl groups in such relative proportions and being condensed in such amount as to provide free hydroxyl groups in the resultant polyester, at least 80 mol.% of said polycarboxylic acid being an aromatic carboxylic acid, said polyester having a softening point in the range of 50°-180° C.,
   (B) at least one curing agent for said polyester which is an aliphatic, cycloaliphatic, heterocyclic or aromatic compound having a softening point of at least 40° C. and contains at least two terminal groups of the general formulae:

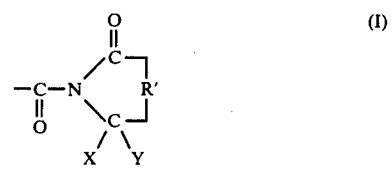

(I)

wherein R' stands for an alkylene group with 1-11 carbon atoms, and X and Y may be the same or different and each represents a hydrogen atom or an alkyl group with 1-5 carbon atoms, or

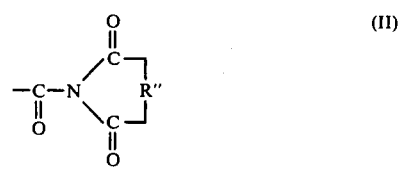

(II)

wherein R" stands for an alkylene group with 1-11 carbon atoms, an alkenylene group, a phenylene group or a substituted phenylene group, the amount of said curing agent being such that the terminal groups thereof are present in a ratio of 0.5-1.5 equivalents per equivalent of the free hydroxyl groups in said polyester; and
   (C) a solid epoxy resin in an amount of 3-15 parts by weight per 100 parts by weight of said ingredient (A).

2. A powder coating composition according to claim 1 wherein said ingredient (B) is at least one selected from the group consisting of terephthaloyl-bis-(N-pyrrolidone), adipoyl-bis-(N-pyrrolidone), terephthaloyl-bis-(N-caprolactam), isophthaloyl-bis-(N-caprolactam), sebacoyl-bis-(N-caprolactam), adipoyl-bis-(N-caprolactam), isophthaloyl-bis-(N-succinimide), adipoyl-bis-(N-succinimide), sebacoyl-bis-(N-phthalimide), fumaroyl-bis-(N-caprolactam), fumaroyl-bis-(N-succinimide), diglycoloyl-bis-(N-caprolactam), diglycoloyl-bis-(N-succinimide), trimellitoyl-tris-(N-caprolactam),

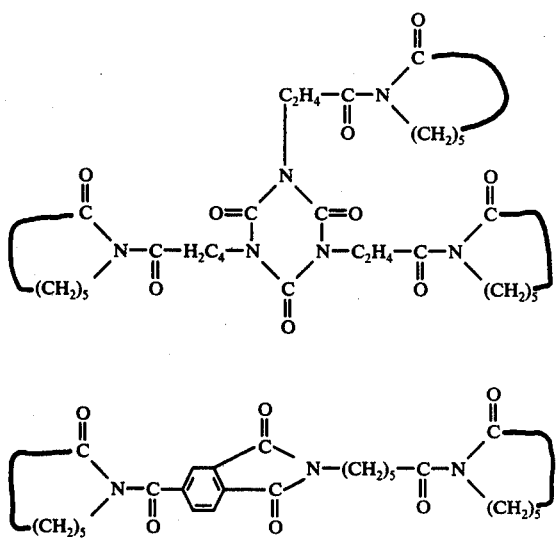

and a mixture of polyacyl (N-lactam) compounds consisting essentially of a compound having 2-4 groupings of the formula:

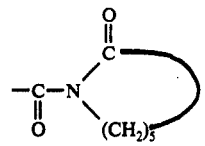

obtained by reacting a polyacid chloride compound which has been obtained by reacting trimethylolpropane with terephtahloyl or isophthaloyl chloride with ε-caprolactam in an amount equivalent to the acid chloride groups of said compound.

3. A powder coating composition according to claim 1 wherein said solid epoxy resin is one derived from a bisphenol and epihalohidrin or a cycloaliphatic one.

4. A powder coating composition according to claim 1 including a pigment and/or a filler.

5. A powder coating composition according to claim 1 including a fluidity adjusting agent.

6. A powder coating composition according to claim 1 including a benzoin in an amount of 0.1-6 parts by weight per 100 parts by weight of said ingredient (A).

7. A powder coating composition according to claim 1 including at least one of tetrabutyl titanate and a condensate thereof in an amount of 0.5-5 parts by weight per 100 parts by weight of said ingredient (A).

8. A method of powder coating which comprises applying to an object to be coated a coating of finely divided particles of the composition of claim 1 and baking the thus applied particle coating at a temperature within the range of 130°-220° C. for about 5-30 minutes.

9. The method of claim 8 wherein the particles of the composition of claim 1 applied to said object are obtained by mixing said mixture comprising the constituents defined in claim 1 at a temperature sufficient to fuse the same but below the reaction temperature of said constituents, then cooling and pulverizing said mixture into particles.

* * * * *

UNITED STATES PATENT OFFICE
CERTIFICATE OF CORRECTION

Patent No. 4,119,679　　　　　　　Dated October 10, 1978

Inventor(s) Hiroshi Nishizawa et al

It is certified that error appears in the above-identified patent and that said Letters Patent are hereby corrected as shown below:

In the Abstract, item [57], paragraph (C), "a said epoxy resin" should read -- a solid epoxy resin --.

Column 1, lines 7 and 8, "November 20, 1975" should read -- October 20, 1975 --.

Signed and Sealed this

Twentieth Day of March 1979

[SEAL]

Attest:

RUTH C. MASON
Attesting Officer

DONALD W. BANNER
Commissioner of Patents and Trademarks